United States Patent [19]
Morishita

[11] Patent Number: 4,991,676
[45] Date of Patent: Feb. 12, 1991

[54] MOTORIZED POWER STEERING APPARATUS

[75] Inventor: Mitsuharu Morishita, Himeji, Japan

[73] Assignee: Mitsubishi Denki Kabushiki Kaisha, Tokyo, Japan

[21] Appl. No.: 408,334

[22] Filed: Sep. 18, 1989

[30] Foreign Application Priority Data

Sep. 22, 1988 [JP] Japan .................................. 63-239418

[51] Int. Cl.5 .............................................. B62D 5/04
[52] U.S. Cl. .................................... 180/79.1; 388/831
[58] Field of Search ....................... 180/79.1; 318/599; 388/804, 811, 819, 829, 831

[56] References Cited

U.S. PATENT DOCUMENTS 4,661,750 4/1987 Mori ..................................... 318/599

FOREIGN PATENT DOCUMENTS 81398 6/1983 European Pat. Off. ............ 180/79.1

Primary Examiner—Mitchell J. Hill
Attorney, Agent, or Firm—Sughrue, Mion, Zinn, Macpeak and Seas

[57] ABSTRACT

A motorized power steering apparatus for a vehicle has a torque sensor which generates an output voltage corresponding to a steering torque exerted by the driver of the vehicle. A motor controller controls the output torque of a drive motor which generates an auxiliary steering force corresponding to the output voltage of the torque sensor. The motor controller is a self-excited pulse width modulation circuit with feedback from the motor which supplies the motor with drive pulses having a pulse width modulated by the output voltage of the torque sensor.

5 Claims, 3 Drawing Sheets

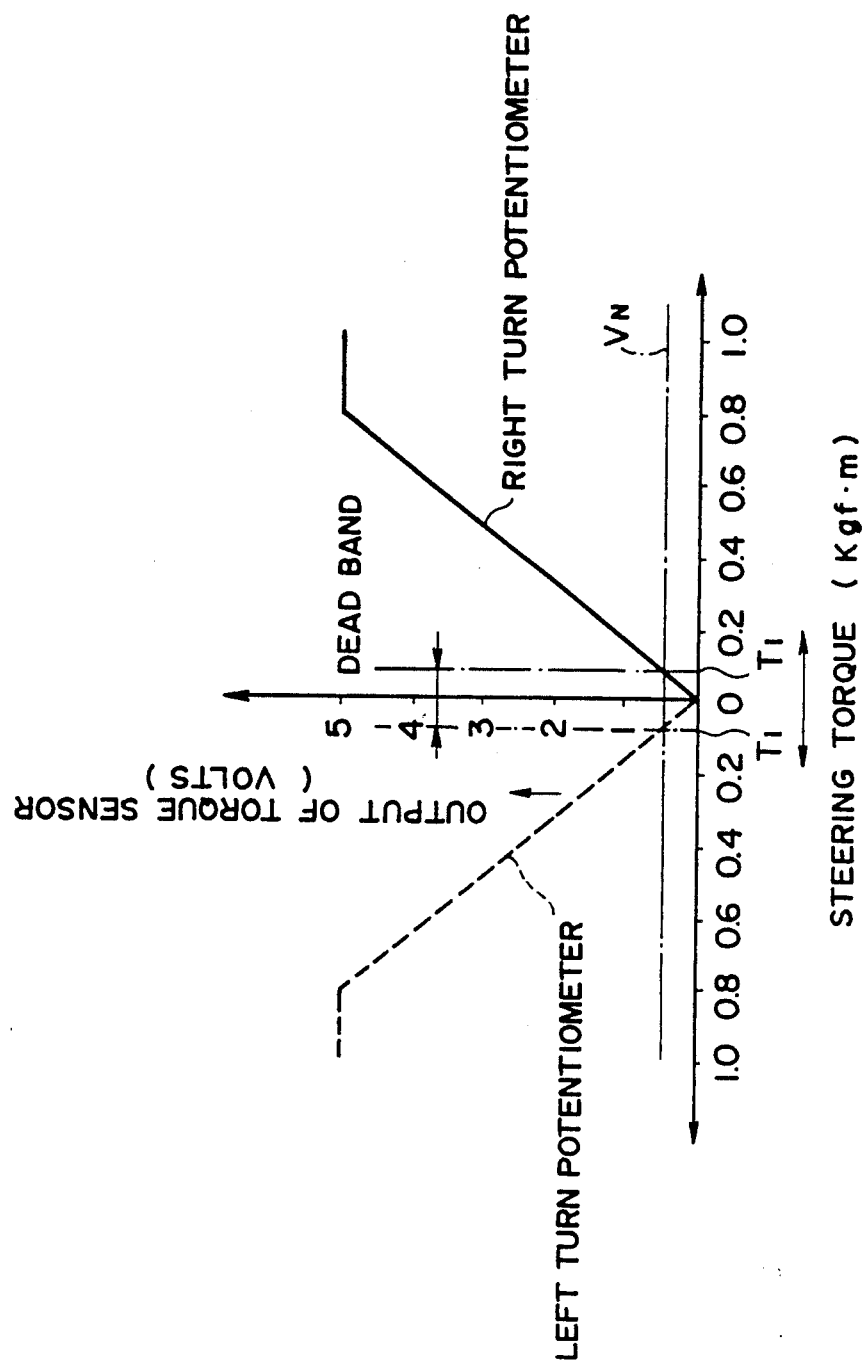

MOTORIZED POWER STEERING APPARATUS

BACKGROUND OF THE INVENTION

This invention relates to a motorized power steering apparatus for automobiles or other vehicles. In the past, power steering apparatuses for automobiles were usually driven by hydraulic power generated by a pump. However, as hydraulic systems are bulky and heavy, in recent years, there has been a trend towards the use of electric motors to provide the drive force for power steering. A power steering apparatus which employs an electric motor to generate an auxiliary torque to assist the steering of the vehicle is referred to as a motorized power steering apparatus.

In a motorized power steering apparatus, a torque sensor measures the steering torque applied by the driver to a steering wheel. An electric motor which is connected to a suitable portion of the steering gear is then controlled in accordance with the measured torque to impart an auxiliary steering force to the steering gear. The auxiliary steering force lessens the force which need by applied to the steering wheel by the driver.

Many conventional power steering apparatuses have a triangular wave generator having a prescribed oscillatory frequency. Open-loop proportional control is performed in which the pulse width of the output of the triangular wave generator is modulated by the output voltage of a torque sensor, and the pulse width modulated signal is input to a motor as a drive signal.

However, in a conventional apparatus which performs open-loop proportional control of the voltage applied to the motor, only the duty cycle of the pulses applied to the motor is controlled, and a battery is used as a voltage supply. The power steering apparatus is often connected to the battery by wiring which produces a large voltage drop when a large current flows through it. Therefore, even if the duty cycle is maintained constant, as the voltage of the power supply can vary, it is difficult to apply a voltage to the motor which is proportional to the output voltage of the torque sensor. When the impedance of the voltage supply is large, there is a considerable possibility of harmful abnormal oscillations being generated.

Furthermore, conventionally a single potentiometer generates torque signals for turns to both the left and right, so when the potentiometer itself generates noise or when there are bad contacts in the wiring or short circuits, a torque signal may be generated in the direction opposite to the direction in which the driver wishes to turn the vehicle, so there is the danger of the power steering apparatus turning the vehicle wheels in the wrong direction.

SUMMARY OF THE INVENTION

It is an object of the present invention to provide a motorized power steering apparatus for a vehicle which does not generate abnormal oscillations.

It is another object of the present invention to provide a motorized power steering apparatus which can not turn the wheels of the vehicle in a direction opposite to the direction in which the driver desires to turn the vehicle.

It is yet another object of the present invention to provide a motorized power steering apparatus which is reliable, simple in structure, and inexpensive.

A motorized power steering apparatus for a vehicle in accordance with the present invention has a torque sensor for generating an output voltage indicative of the steering torque exerted by a driver of the vehicle. The output torque of a motor which exerts an auxiliary steering force on the steering gear of the vehicle is controlled by a motor controller in accordance with the output voltage of the torque sensor. The motor controller comprises a self-excited pulse width modulation circuit with feedback from the motor. The motor controller generates output pulses having a pulse width which is modulated by the output voltage of the torque sensor. The pulses are applied to the motor as a drive signal.

Because the pulse width modulation circuit is self-excited with feedback from the motor, a constant relationship can be maintained between the output voltage of the torque sensor and the voltage which is supplied to the motor.

Various types of torque sensors may be employed, but in a preferred embodiment, the torque sensor includes a right turn potentiometer which generates an output voltage proportional to the steering torque only when the steering torque is in a direction to turn the vehicle to the right and a separate left turn potentiometer which generates an output voltage proportional to the steering torque only when the steering torque is in a direction to steer the vehicle to the left. The motor controller controls the voltage applied to the motor so that the output torque of the motor is proportional to the output of only one of the potentiometers at a given time. The motor controller includes a logic circuit which prevents the motor from operating when both of the potentiometers simultaneously generate an output voltage of above a prescribed level. As a result, the motor can be prevented from steering the vehicle in the wrong direction.

BRIEF DESCRIPTION OF THE DRAWINGS

FIG. 3 is a graph showing the output of the torque sensor as a function of the steering torque applied to the steering wheel by the driver of the vehicle.

DESCRIPTION OF THE PREFERRED EMBODIMENTS

Figure 1:
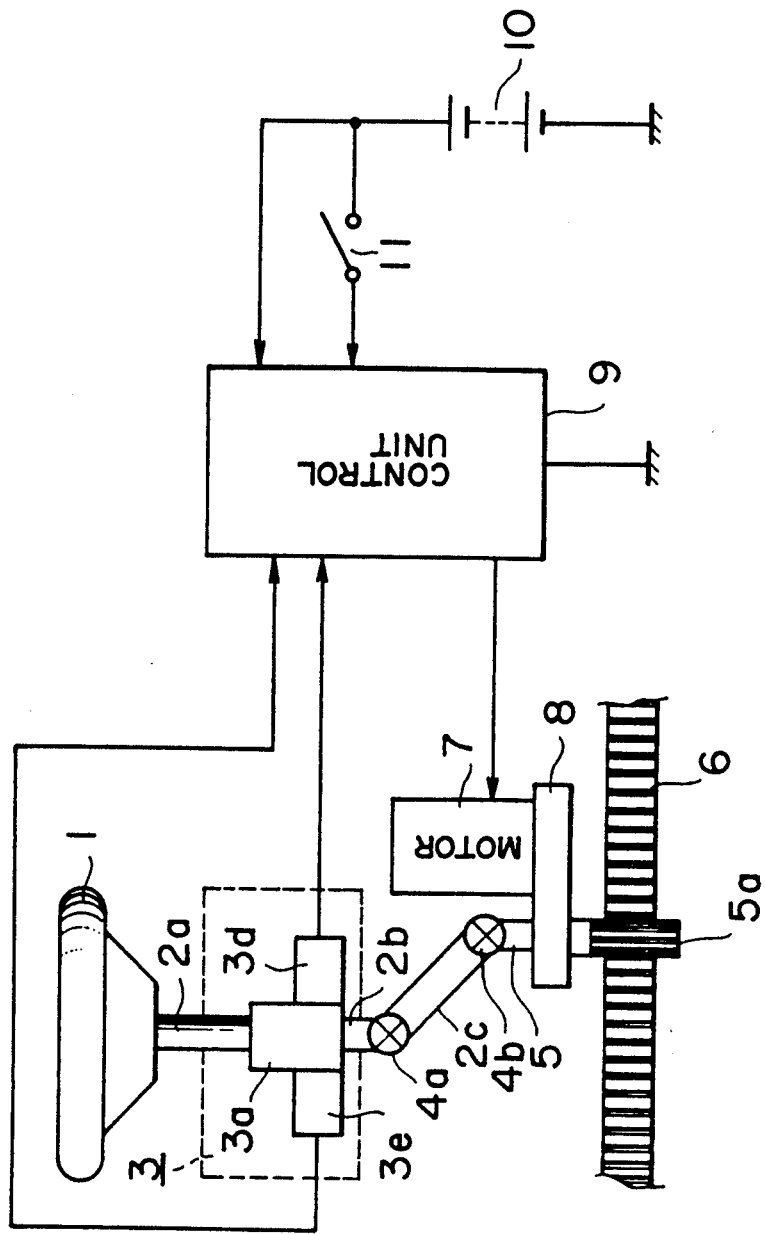
FIG. 1 is a block diagram of an embodiment of a motorized power steering apparatus according to the present invention.

A preferred embodiment of a motorized power steering apparatus according to the present invention will now be described while referring to the accompanying drawings. As shown in FIG. 1, which is a block diagram of this embodiment, a steering wheel 1 of an automotive vehicle is mounted on the upper end of a first steering shaft 2a. The lower end of the first steering shaft 2a is connected to the upper end of a second steering shaft 2b by a torque sensor 3. The torque sensor 3 includes a torque-displacement converter 3a which produces a displacement which is proportional to the steering torque applied to the steering wheel by the driver of the vehicle. Any conventional torque-displacement converter can be employed, such as the torque-displacement converter disclosed in U.S. Pat. No. 4,666,010 in which a torsion bar which connects two steering shafts undergoes angular displacement due to twisting which is proportional to the steering torque applied to a steering wheel. The torque sensor 3 also includes a right turn potentiometer 3d and a left turn potentiometer 3e. Each potentiometer has a wiper arm which is moved along a resistive element by the displacement of the torque-displacement converter 3a. The voltage at the wiper arm of each potentiometer constitutes an output voltage of the torque sensor 3 and is provided to a control unit 9 as an indication of the steering torque to the right or to the left, respectively.

The lower end of the second steering shaft 2b is connected to the upper end of a third steering shaft 2c by a first universal joint 4a, and the lower end of the third steering shaft 2c is connected to the upper end of a drive shaft 5 by a second universal joint 4b. A pinion gear 5a is formed on the lower end of the drive shaft 5. The pinion gear 5a meshes with a rack 6 of the steering gear of the vehicle.

An auxiliary torque can be applied to the drive shaft 5 by an electric motor 7 such as a shunt-wound or permanent magnet DC motor. The motor 7 is connected to the drive shaft 5 by a reduction gear 8 which reduces the rotational speed of the motor 7. The operation of the motor 7 is controlled by the control unit 9, which provides the motor 7 with a pulse width modulated drive signal.

The control unit 9 is powered by the vehicle battery 10, which typically is a 12-volt battery. Portions of the control unit 9 are connected directly to the battery 10, while other portions are connected to the battery 10 via a key switch 11.

Figure 2:
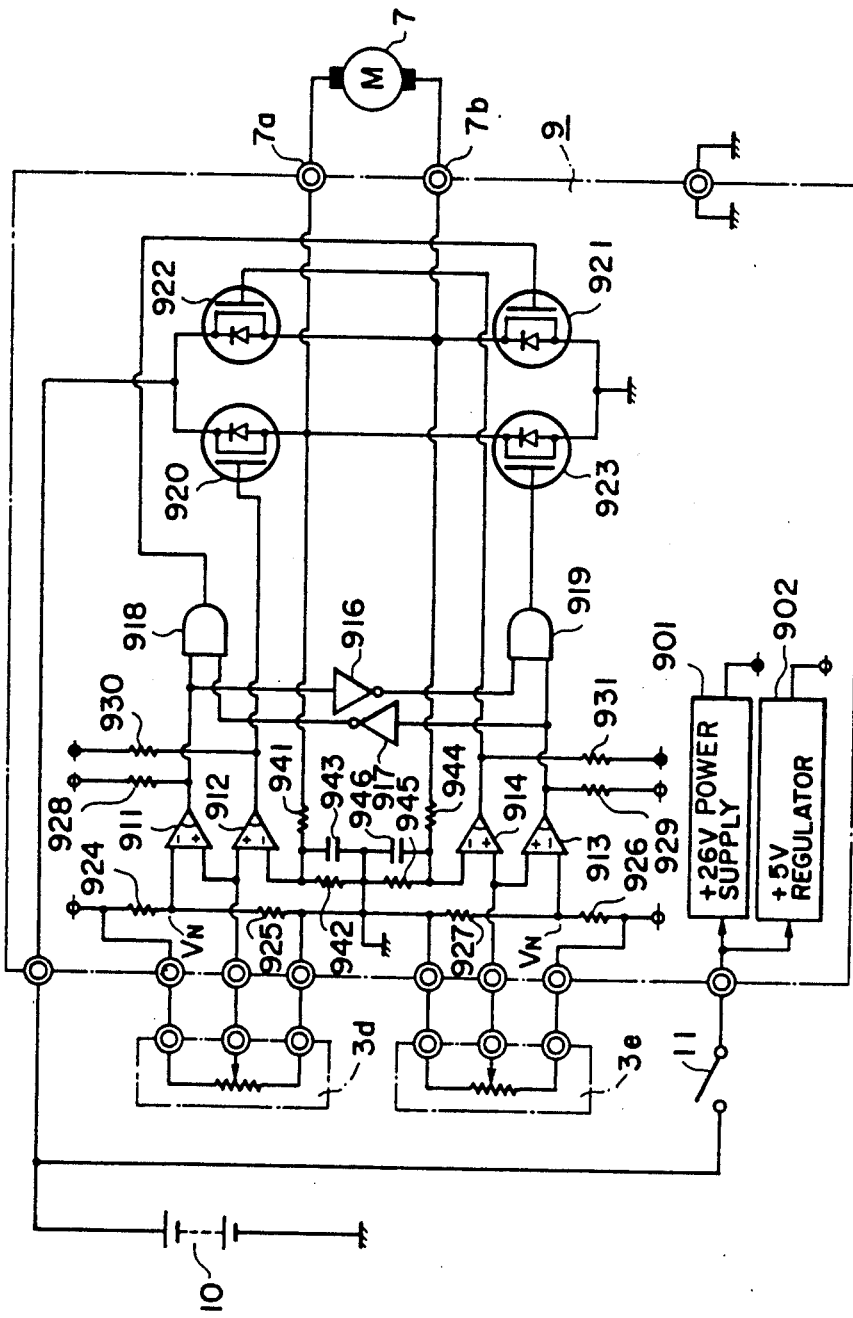
FIG. 2 is a circuit diagram of the control unit of the embodiment of FIG. 1.

FIG. 2 is a circuit diagram of the control unit 9 of FIG. 1, which constitutes a self-excited pulse width modulation circuit with feedback from the motor 7. A first comparator 911 has a positive input terminal which is connected to the wiper arm of the right turn potentiometer 3d and a negative input terminal which is connected to the junction of two series resistors 924 and 925. A second comparator 912 has a positive input terminal which is connected to the wiper arm of the right turn potentiometer 3d and a negative input terminal which is connected to ground through a resistor 942. A third comparator 913 has a positive input terminal which is connected to the wiper arm of the left turn potentiometer 3e and a negative input terminal which is connected to the junction of two series resistors 926 and 927. A fourth comparator 914 has a positive input terminal which is connected to the wiper arm of the left turn potentiometer 3e and a negative input terminal which is grounded through a resistor 945.

Resistors 924 and 925 are connected in series between the output terminal of a 5-volt voltage regulator 902 and ground. Resistors 926 and 927 are likewise connected in series between the output terminal of the voltage regulator 902 and ground. A terminal at one end of the resistive element of each potentiometer 3d and 3e is connected to the output terminal of the voltage regulator 902, while the terminal at the other end of the resistive element is grounded.

The output terminals of the first comparator 911 and the third comparator 913 are connected to the output terminal of the voltage regulator 902 by pull-up resistors 928 and 929, respectively. The output terminals of the second comparator 912 and the fourth comparator 914 are connected to the output terminal of a 26-volt power supply 901 by pull-up resistors 930 and 931, respectively. The power supply 901 and the voltage regulator 902 are connected to the battery 10 by the key switch 11.

The output terminal of the first comparator 911 is also connected to the input terminal of a first inverter 916 and to one of the input terminals of a first AND gate 918. The output terminal of the third comparator 913 is connected to the input terminal of a second inverter 917 and to one of the input terminals of a second AND gate 919. The output terminal of the first inverter 916 is connected to the other input terminal of the second AND gate 919, and the output terminal of the second inverter 917 is connected to the other input terminal of the first AND gate 918.

The electric motor 7 is driven by first through fourth power MOSFET's 920–923. The gate of the first MOSFET 920 is connected to the output terminal of the second comparator 912, its drain is connected to the battery 10, and its source is connected to a first terminal 7a of the electric motor 7. The gate of the second MOSFET 921 is connected to the output terminal of the first AND gate 918, its drain is connected to a second terminal 7b of the motor 7, and its source is grounded. The gate of the third MOSFET 92 is connected to the output terminal of the fourth comparator 914, its drain is connected to the battery 10, and its source is connected to the second terminal 7b of the electric motor 7. The gate of the fourth MOSFET 923 is connected to the output terminal of the second AND gate 919, its drain is connected to the first terminal 7a of the electric motor 7, and its source is grounded.

The first terminal 7a of the motor 7 receives a positive input voltage when the motor 7 is being driven so as to steer the wheels of the vehicle for a right turn, and the second terminal 7b receives a positive input voltage during a left turn.

A resistor 941 is connected between the first terminal 7a of the motor 7 and resistor 942, and a capacitor 943 is connected from the junction of resistors 941 and 942 to ground. Similarly, a resistor 944 is connected between the second terminal 7b of the motor 7 and resistor 945, and a capacitor 946 is connected from the junction of resistors 944 and 945 to ground. Capacitors 943 and 946 determine the frequency of self-excited oscillation of the control unit 9. Via resistors 941 and 944, the second and fourth comparators 912 and 914 receive a feedback signal from the motor 7.

FIG. 3 illustrates the output characteristics of the torque sensor 3 as a function of the steering torque applied to the steering wheel 1 by the driver. When no steering torque is applied to the steering wheel 1, the output of both potentiometers 3d and 3e is zero volts. When a rightward torque is applied to the steering wheel 1, the output of the right turn potentiometer 3d increases linearly with increasing torque until the steering torque reaches a value of approximately 0.8 kgf-m, at which the output voltage saturates at approximately 5 volts. When the right turn potentiometer 3d has a non-zero output, the output of the left turn potentiometer 3e remains at zero volts. Conversely, when a leftward steering torque is applied to the steering wheel 1, the output of the right turn potentiometer 3d is zero volts, while the output of the left turn potentiometer 3e increases linearly with increasing steering torque until the steering torque reaches approximately 0.8 kgf-m, upon which the output saturates at approximately 5 volts.

When the unillustrated engine of the vehicle is started and the key switch 11 is closed, 12 volts are supplied by the battery 10 to the power supply 901 and the voltage regulator 902, and the control unit 9 begins to operate.

If the driver then applies a steering torque to the steering wheel 1, the torque sensor 3 generates an output voltage corresponding to the magnitude and direction of the steering torque as shown in FIG. 3.

When the driver applies a steering torque to the steering wheel 1 to turn the wheels of the vehicle to the right, the voltage of the wiper arm of the right turn potentiometer 3d is input to the positive input terminals of the first and second comparators 911 and 912. If the output voltage of the right turn potentiometer 3d exceeds the voltage $V_N$ at the junction of resistors 924 and 925, the output of the first comparator 911 goes high. As no voltage has yet been applied to the motor 7, the voltage at the junction of resistors 941 and 942 is low, and the output of the second comparator 912 goes high. The output voltage of the left turn potentiometer 3e is 0 volts, so the outputs of the third and fourth comparators 913 and 914 are low. Therefore, the output of the first inverter 916 is low and the output of the second inverter 917 is high so the output of the first AND gate 918 is high, the output of the second AND gate 919 is low, and the first and second MOSFET's 920 and 921 are turned on. Therefore, a voltage from the battery 10 is applied to the motor 7 through the first MOSFET 920, and the motor 7 begins to conduct. The positive input voltage for the motor 7, i.e., the voltage at terminal 7a, is also applied across resistors 941 and 942. Therefore, the voltage at the junction of resistors 941 and 942 rises exponentially with a time constant determined by capacitor 943. When the voltage at the junction of resistors 941 and 942 exceeds the voltage at the positive input terminal of the second comparator 912, which is the output voltage of the right turn potentiometer 3d, the output of the first comparator 911 remains high but the output of the second comparator 912 goes low, so the first MOSFET 920 is turned off, and the supply of current to the motor 7 is interrupted. When this interruption takes place, the voltage at the junction of resistors 941 and 942 falls exponentially with a time constant determined by capacitor 943. When the voltage at the junction of resistors 941 and 942 falls below the voltage at the positive input terminal of the second comparator 912, the output of the second comparator 912 again goes high, and the first MOSFET 920 is again turned on to drive the motor 7. In this manner, the second comparator 912 is repeatedly turned on and off, and a series of pulses are supplied to the motor 7 as a supply voltage. A current which is determined by the supply voltage and the counter emf corresponding to the rotational speed of the motor 7 flows through the motor 7. The motor 7 generates an auxiliary torque to turn the wheels of the vehicle to the right, and the steering torque which need be exerted by the driver of the vehicle is reduced. The width of the pulses which are supplied to the motor 7 is dependent on the output voltage of the potentiometer 3d. The greater the output voltage of the potentiometer 3d, the longer is the pulse width.

When the driver exerts a steering torque to turn the vehicle to the left, the third and fourth comparators 913 and 914 are controlled in a manner similar to that described above with respect to the first and second comparators 911 and 912, and a voltage is supplied to the motor 7 to steer the wheels of the vehicle to the left.

The AND gates 918 and 919 prevent the motor 7 from operating unless the output of either the first comparator 911 or the third comparator 913 is high. This state occurs when the output voltage of the right turn potentiometer 3d exceeds the voltage $V_N$ at the junction of resistors 924 and 925, or when the output voltage of the left turn potentiometer 3e exceeds the voltage $V_N$ at the junction of resistors 926 and 927. If the driver exerts only a very low torque of less than T1 on the steering wheel 1, the outputs of the potentiometers 3d and 3e will not exceed $V_N$, so the motor 7 will not be turned on. Accordingly, there is a dead band of steering torque on either side of a neutral torque in which power steering is not performed.

Normally, only one of the potentiometers generates an output voltage at a time. If the potentiometers should malfunction (due, for example, to noise generated by the torque sensor 3 itself, bad contacts, broken wires, or short circuits) and both generate an output voltage of greater than $V_N$ at the same time, the outputs of both AND gates 918 and 919 will go low and prevent MOSFET'S 921 and 923 from conducting. Therefore, the motor 7 will not be able to operate, and there will be no possibility of the motor 7 exerting an auxiliary torque in a direction opposite to the direction in which the driver wishes to steer the vehicle. Although the steering will feel heavy because the motor 7 is not operating, as the steering wheel 1 is mechanically linked to the rack 6, the driver will still be able to safely steer the vehicle.

As described above, a motorized power steering apparatus in accordance with the present invention performs pulse width modulation control of the voltage which is applied to a motor 7 with feedback from the motor 7. Therefore, a constant relationship can be maintained between the output voltage of the torque sensor 3 and the voltage which is applied to the motor 7. As a result, the motor voltage is not influenced by voltage drops in the vehicle wiring, the current flowing through the motor, and other factors, and stable operation can be performed without abnormal oscillations.

What is claimed is:

1. A motorized power steering apparatus for a vehicle comprising:
   torque sensing means for generating an output voltage proportional to both a supply voltage and to a steering torque exerted by a driver of the vehicle;
   a motor for generating an auxiliary steering force;
   a self-excited pulse width modulation circuit for supplying the motor with drive pulses having a pulse width which is modulated by the output voltage of the torque sensing means; and
   feedback means embodying RC time constant means (941–946) connected between the motor and the pulse width modulation circuit for preventing variations in the net energy applied to the motor due to variations in the supply voltage.

2. A power steering apparatus as claimed in claim 1, wherein the pulse width modulation circuit comprises:
   a bridge circuit including a plurality of switching elements, the motor being connected across the bridge circuit;
   a capacitor and a resistor connected in parallel between the motor and ground, and defining said feedback means; and
   a comparator having a first input terminal to which the output voltage of the torque sensing means is applied and a second input terminal connected to the junction of the capacitor and the resistor, the output voltage of the comparator being supplied to a gate of the switching element of the bridge circuit.

3. A power steering apparatus as claimed in claim 1, wherein the torque sensing means comprises a right turn potentiometer for generating an output voltage corresponding to a steering torque exerted by a driver of the vehicle only when the steering torque is in a direction to turn the vehicle to the right and a left turn potentiometer for generating an output voltage corresponding to a steering torque exerted by the driver only when the steering torque is in a direction to turn the vehicle to the left.

4. A power steering apparatus as claimed in claim 3, wherein:

the torque sensing means includes a torque-displacement converter for generating a displacement proportional to a steering torque exerted thereon; and each of the potentiometers has a resistive element and a wiper arm which is linked to the torque-displacement converter so as to be moved along the resistive element by the displacement of the torque-displacement converter, the output voltage of each potentiometer being the voltage at its wiper arm.

5. A power steering apparatus as claimed in claim 3, further comprising mean (916,917) for preventing the motor from operating when both of the potentiometers generate an output voltage of above a prescribed level at the same time.

* * * * *